US011220283B2

(12) United States Patent
Proulx (10) Patent No.: US 11,220,283 B2
(45) Date of Patent: Jan. 11, 2022

(54) FRONT SKI SUSPENSION SYSTEM FOR A SNOWMOBILE AND METHOD FOR INSTALLING THE SAME

(71) Applicant: SURFACE PRO DESIGN INC., Sherbrooke (CA)

(72) Inventor: Dave Proulx, Sherbrooke (CA)

(73) Assignee: SURFACE PRO DESIGN INC., Compton (CA)

( * ) Notice: Subject to any disclaimer, the term of this patent is extended or adjusted under 35 U.S.C. 154(b) by 0 days.

(21) Appl. No.: 16/481,686

(22) PCT Filed: Aug. 28, 2018

(86) PCT No.: PCT/CA2018/051037
§ 371 (c)(1),
(2) Date: Jul. 29, 2019

(87) PCT Pub. No.: WO2019/041033
PCT Pub. Date: Mar. 7, 2019

(65) Prior Publication Data
US 2019/0359243 A1 Nov. 28, 2019

Related U.S. Application Data

(60) Provisional application No. 62/551,022, filed on Aug. 28, 2017.

(51) Int. Cl.
*B62B 17/04* (2006.01)
*B62D 55/07* (2006.01)
(52) U.S. Cl.
CPC .............. *B62B 17/04* (2013.01); *B62D 55/07* (2013.01)

(58) Field of Classification Search
CPC ................................ B62B 17/04; B62D 55/07
See application file for complete search history.

(56) References Cited

U.S. PATENT DOCUMENTS 4,342,372 A * 8/1982 Hayes .................... B62M 27/00
                                                                180/182
4,374,591 A * 2/1983 Kobayashi .............. B62B 17/04
                                                                280/21.1

(Continued)

FOREIGN PATENT DOCUMENTS

CA           2197619 A1    8/1997
CA           2260192 A1    7/2000

(Continued)

OTHER PUBLICATIONS

International Search Report dated Dec. 10, 2018 issued in the corresponding patent application PCT/CA2018/051037.

(Continued)

*Primary Examiner* — James A Shriver, II
*Assistant Examiner* — Michael T. Walsh
(74) *Attorney, Agent, or Firm* — Brouillette Legal Inc.; Robert Brouillette (57) ABSTRACT

The present invention is directed to a single-ski assembly being configured to convert a double-ski conventional snowmobile to a single-ski snowmobile while improving the steerability, the maneuverability and the floatation of snowmobiles and thus by providing an adjustable angular front orientation of the ski. The single-ski assembly comprises a damping system adapted to control the longitudinal direction of the snowmobile and a steering mechanism adapted to control the upward and downward rotation of the ski.

15 Claims, 10 Drawing Sheets

(56) References Cited

U.S. PATENT DOCUMENTS

| | | | | |
|---|---|---|---|---|
| 4,591,173 | A * | 5/1986 | Marier | B62B 13/10 |
| | | | | 180/190 |
| 5,586,614 | A | 12/1996 | Kouchi et al. | |
| 5,829,545 | A * | 11/1998 | Yamamoto | B62M 27/02 |
| | | | | 180/190 |
| 5,996,717 | A | 12/1999 | Hisadomi | |
| 6,199,649 | B1 * | 3/2001 | Alanko | B62B 13/08 |
| | | | | 180/186 |
| 8,376,389 | B2 * | 2/2013 | Wrightman | B62M 27/02 |
| | | | | 280/606 |
| 9,751,552 | B2 | 9/2017 | Mangum et al. | |
| 2002/0060102 | A1 * | 5/2002 | Boivin | B62M 27/02 |
| | | | | 180/184 |
| 2004/0134702 | A1 * | 7/2004 | Karpik | B62M 27/00 |
| | | | | 180/190 |
| 2005/0077094 | A1 * | 4/2005 | Jordan | B62D 55/04 |
| | | | | 180/9.26 |
| 2008/0017431 | A1 * | 1/2008 | Sadakuni | B62M 27/02 |
| | | | | 180/193 |
| 2013/0105237 | A1 * | 5/2013 | Mallette | B62M 27/02 |
| | | | | 180/190 |
| 2017/0066502 | A1 * | 3/2017 | Will | B62M 9/14 |
| 2017/0129526 | A1 * | 5/2017 | Mangum | B62B 17/04 |
| 2017/0217541 | A1 * | 8/2017 | Sawai | B62B 13/06 |

FOREIGN PATENT DOCUMENTS

| | | |
|---|---|---|
| CA | 2478003 A1 | 2/2005 |
| CA | 2887975 A1 | 9/2016 |
| CA | 2996650 A1 | 3/2017 |
| CA | 2995818 A1 | 8/2018 |
| JP | H07149281 A | 6/1995 |
| WO | 0043265 A1 | 7/2000 |

OTHER PUBLICATIONS

European Search Report dated May 11, 2021 issued in the corresponding patent application EP 18851800.

* cited by examiner

FRONT SKI SUSPENSION SYSTEM FOR A SNOWMOBILE AND METHOD FOR INSTALLING THE SAME

CROSS-REFERENCE TO RELATED APPLICATIONS

The present patent application claims the benefits of priority of Provisional U.S. Patent Application No. 62/551,022, entitled "FRONT SKI SUSPENSION SYSTEM FOR A SNOWMOBILE AND METHOD FOR INSTALLING THE SAME", and filed at the United States Patent and Trademark Office on Aug. 28, 2017, the content of which is incorporated herein by reference.

FIELD OF THE INVENTION

The present invention generally relates to apparatus, devices, and methods in relation to conversion kits for snowmobiles. More particularly, the present invention relates to a front ski suspension system for a snowmobile.

BACKGROUND OF THE INVENTION

Snow bikes are well known in the art. Furthermore, various track conversion kits and ski steering assemblies exist to convert a two-wheeled vehicle, such as a motorbike, to a snow bike. Also, dedicated vehicles having a single ski and a track kit have also been known in the art.

The international patent application publication no. WO 2017/031592 discloses a ski system and track system for a vehicle. As disclosed, such vehicle uses a frame similar to a motocross bike. A ski is mounted to a standard front suspension and a track kit is attached to the rear drive shaft.

The U.S. Pat. No. 9,469,327 discloses a front suspension system for a snow bike. The front suspension system comprises two front skis to provide better stability.

Other track conversion kits and assemblies have been disclosed, such as the U.S. Pat. No. 6,431,301 and the US patent application No. 2016/0280331. Such kits are used to convert a two-wheeled vehicle such as a motorbike to a snow bike by replacing the front wheel with a front central ski system and the rear wheel with a track kit system.

However, none of the above-mentioned kits and assemblies allows converting a snowmobile having two front ski systems disposed each on one front side of the snowmobile to a snowmobile having one front central ski system. Thus, there is still a need to improve the conversion of a snowmobile having two front skis to a single-ski snowmobile, typically known as a snowbike.

SUMMARY OF THE INVENTION

The shortcomings of the prior art are generally mitigated by providing a front ski suspension system for a snowmobile configured to convert a double-ski snowmobile to a single-ski snowmobile while allowing an adjustable angular front orientation of the single-ski.

In one aspect of the invention, the present system aims at improving the steering of single-ski snowmobiles and aims at improving floatation on snow of the front portion of the single-ski snowmobile.

In another aspect of the invention, the present system aims at improving the steerability, maneuverability and floatation of snowmobiles by providing an adjustable angular front orientation of the ski.

In a further aspect of the invention, the present system aims at facilitating snowmobiling in mountain conditions, where the snow is generally loose, powder snow, and being often deeper than the height of the skis.

In yet another aspect of the invention, the present system aims at providing improved stability to single-ski snowmobiles when travelling over compacted snow and wherein the runner on the bottom of the ski is always in contact with compacted surface.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel front ski suspension system for a snowmobile will be described hereinafter. Although the invention is described in terms of specific illustrative embodiments, it is to be understood that the embodiments described herein are by way of example only and that the scope of the invention is not intended to be limited thereby.

Figure 1:
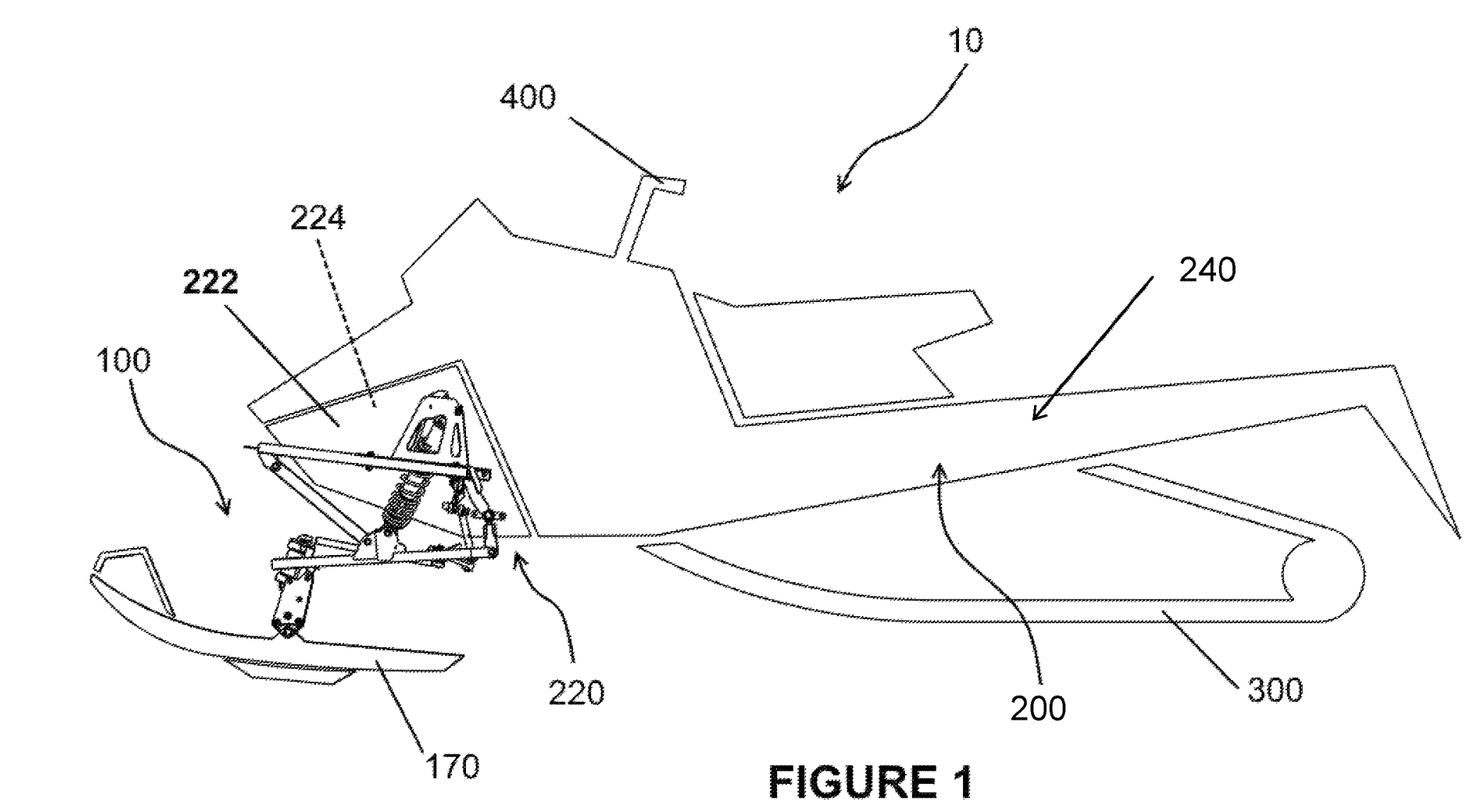
FIG. 1 is an elevation view of a side of a snowmobile comprising a single-ski assembly in accordance with the principles of the present invention.

Referring to FIG. 1, a snowmobile 10 equipped with a front ski suspension assembly 100 is shown. The snowmobile 10 generally comprises a main frame or body 200 comprising a front section 220 and a rear section 240. The front section 220 is generally adapted to receive a ski suspension assembly 100 and the rear section 240 is generally adapted to receive an endless track 300. The front section 220 typically comprises a driver left end 222 and a driver right end 224. The snowmobile 10 further comprises a steering system 400, preferably handlebars, adapted to turn or pivot the front ski assembly 100. The steering system 400 generally aims at allowing a user to drive and to control the movement of the snowmobile 10. Typically, the steering system 400 is operatively connected, via a steering rod or another suitable connector, to the ski assembly 100. When the ski assembly pivots through the movement of the steering assembly 400, the orientation of the ski 101 controls the direction of the snowmobile 10.

Understandably, the front ski assembly 100 may be embodied as a conversion kit for typical snowmobile 10 comprising two front skis. In yet other embodiments, the ski assembly 100 may be installed by a snowmobile manufacturer as original equipment of the manufacturer.

In a preferred embodiment, the single-ski front assembly 100 is attached to the front portion 220 of the frame 200 of the snowmobile 10 with standard or factory attaching means generally adapted to receive two skis. Understandably, in other embodiments, other specific attachment means may be used to attach the single-ski front assembly 100 to the snowmobile 10.

Still referring to FIG. 1, the single-ski assembly 100 may be installed to the front underside section 220 of the snowmobile 10. The single-ski assembly 100 is preferably symmetrically mounted to both sides 222 and 224 (not shown) of the snowmobile. Such attachment generally aims at centering the single-ski assembly 100 about a central longitudinal axis (not shown) of the snowmobile 10. Understandably, other methods of attachment to the snowmobile 10 (i.e. asymmetrical mounting) may be used without departing from the scope of the present invention.

Referring now to FIGS. 2 to 4 and 10, a preferred embodiment of the single-ski assembly 100 is illustrated. The assembly 100 generally forms a three arches suspension. The three arches suspension comprises three arch-shaped portions 110, 120 and 130. Two of the arch-shaped portions 110 and 120 are attached to the snowmobile 10. The third substantially arch-shaped portion connects the first 110 and the second 120 arch-shaped portions. The attaching sections 110 and 120 are preferably symmetrically attached to the front left underside 222 (see FIG. 1) and to the front right underside 224 (not shown) of the snowmobile 10.

In other embodiments, the assembly 100 may comprise two arches 110 and 120 or may further comprise four arches 110, 120, 130 and 160.

In a preferred embodiment, the single-ski assembly 100 is generally symmetric about a central longitudinal axis (not shown).

Figure 2:
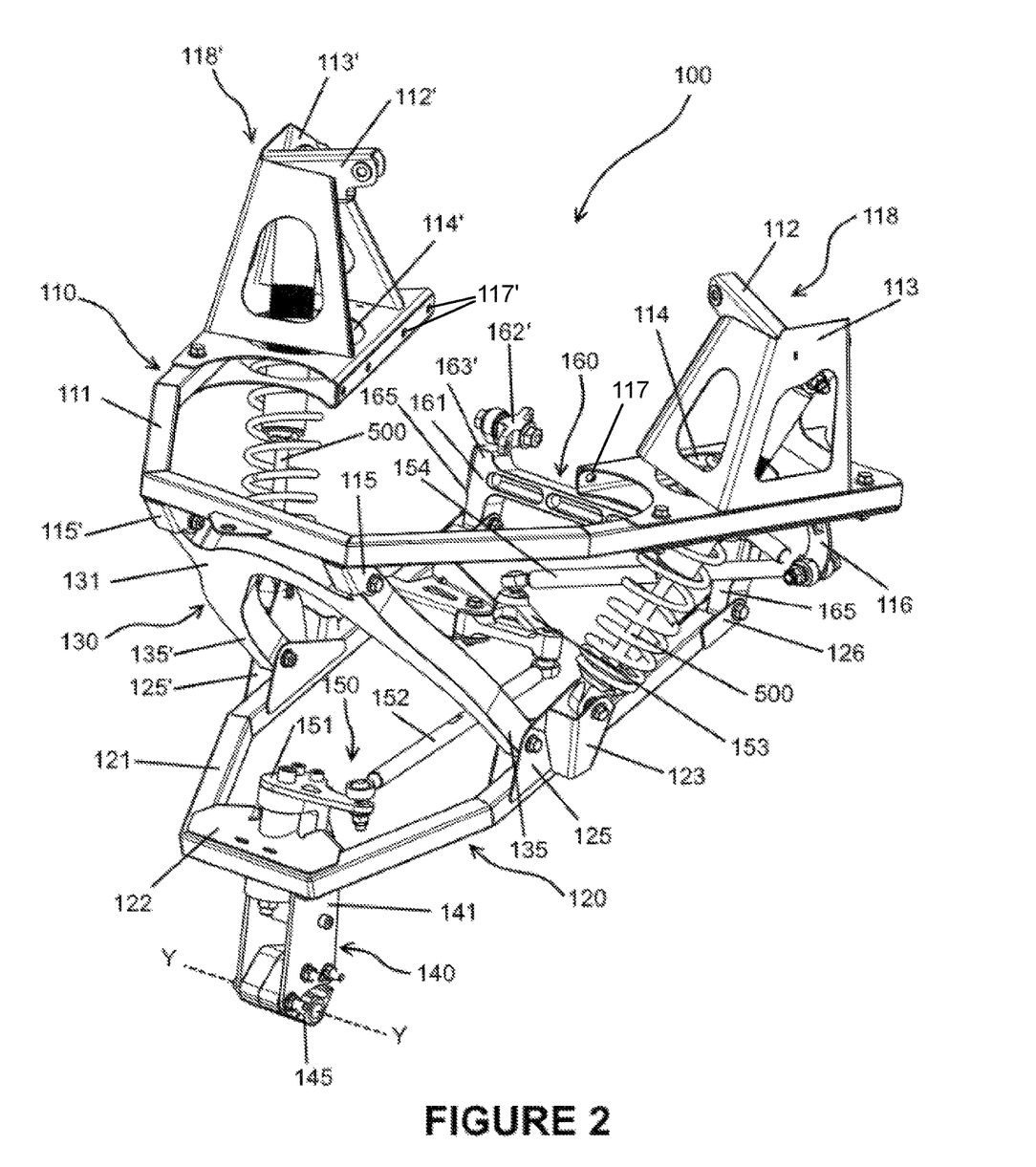
FIG. 2 is a top perspective view of the single-ski assembly of FIG. 1.
Figure 3:
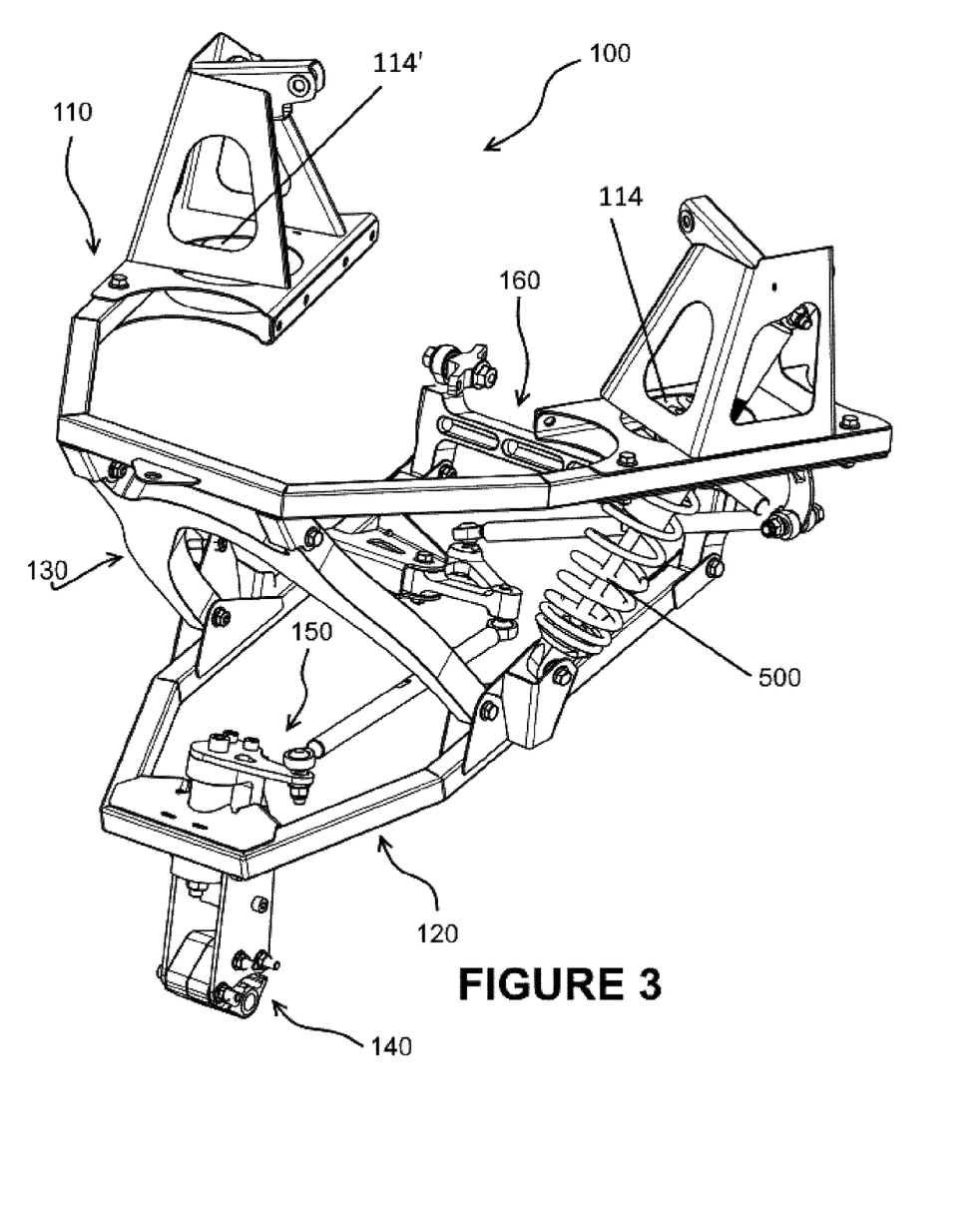
FIG. 3 is a top perspective view of the single-ski assembly of FIG. 1 shown with only one damping assembly.
Figure 4:
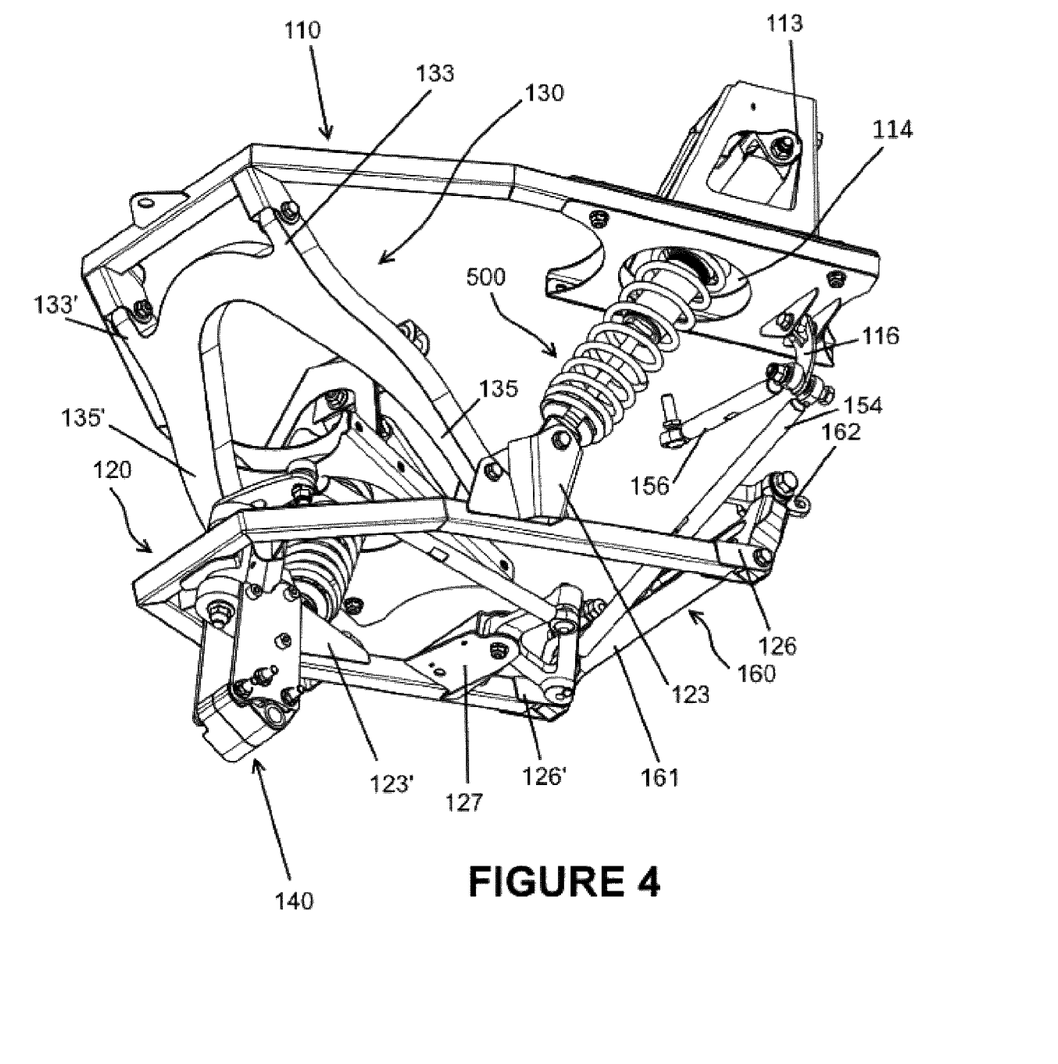
FIG. 4 is a bottom perspective view of the single-ski assembly of FIG. 1.

Still referring to FIGS. 2 to 4, the first attaching section 110 comprises a frame 111 connected to two attaching portions 118 and 118'. The attaching portions 118 and 118' are adapted to be attached to the snowmobile 10 and to receive one end of the suspension assembly 500. Each attaching portion 118 and 118' generally comprises connecting members 112 and 112' adapted to be attached to the front underside 222 or 224 (not shown) of the snowmobile 10, typically being the upper suspension attachment point of the suspension assemblies 500. The attaching portions 118 and 118' further comprise attaching points 113 and 113' for one of the ends of the suspension assemblies 500 of the snowmobile 10. In certain embodiments, the first attaching section 110 may further comprise attachment points 117 and 117' adapted to further secure the attaching section 110 to the front underside 222 or 224 (not shown) of the snowmobile 10. In particular, the attachment points 117 and 117' may be affixed to an upper mounting point knot shown) of the snowmobile 10 typically adapted to receive an upper control arm of a conventional snowmobile front suspension assembly.

One skilled in the art shall understand that even if the present document refers to pivotally attaching the assembly 100 to the snowmobile 10 and/or to pivotally attaching other components, the present invention is not limited insofar to such pivoting attachment system. Indeed, other attachment could be used such as slides.

In a preferred embodiment, the connecting members 112 and 112' are pivotally attached to the front underside 222 or 224 of the snowmobile 10. Such pivoting attachment 112 and 112' generally allows the connecting member to pivot about a first axis. The first axis is typically adapted to be substantially parallel along the length of the snowmobile.

In a preferred embodiment, the attaching portions 118 and 118' further comprise an aperture or passage 114 and 114', each of the apertures 114 or 114' being adapted to allow passage of one of the suspension assembly 500 of the snowmobile 10.

In a preferred embodiment, the frame 111 is generally U-shaped. Understandably, any other shape known in the art allowing the assembly 100 to be attached on each side 222 and 224 of the snowmobile 10 could be use without departing from the scope of the present invention. As an example, the frame 121 may be shaped in more than one plan.

The second attaching section 120 comprises a frame 121, an attachment point 122 of the steering rod of the snowmobile 10, attaching points 123 and 123' for the other end of the suspension assemblies 500 and attachment points 126 and 126' adapted to receive a lower attaching portion 160. In a preferred embodiment, the second attaching section 120 further comprises a second attaching point 127 adapted to receive the steering link assembly 150. Understandably, such linking assembly 150 could be unitary with the frame 121 or could be replaced with any other linking assembly known in the art.

In some embodiments, the said other end of the suspension assemblies 500 may be pivotally attached to the attaching points 123 and 123'. Such pivoting attachment points 123 and 123' generally allows the connecting member to pivot about a second axis. The second axis is typically adapted to be substantially parallel along the width of the snowmobile. In such embodiments, the lower portion of the system 120 is adapted to pivot along the second axis while the upper portion 110 is adapted to pivot along the first axis. The combined pivoting movements generally aims at raising the front portion of the snowmobile ski when the suspension is compressed and to lower the said front portion of the snowmobile ski when the suspension expands.

In a preferred embodiment, the frame 121 is generally U-shaped. Understandably, any other shape known in the art allowing the assembly 100 to be attached on each bottom side 222 and 224 of the snowmobile 10 could be use without departing from the scope of the present invention. As an example, the frame 121 may be shaped in more than one plan.

The first attaching section 110 and the second attaching section 120 are pivotally connected to one another. In a preferred embodiment, the third portion 130 connects the first attaching section 110 and the second attaching section 120. Preferably, the first section 110 is located above the second section 120.

The third portion 130 comprises a frame 131. In a preferred embodiment, the frame 131 is generally H-shaped, the frame 131 comprising two upper legs 133 and 133' and two lower legs 135 and 135'. The upper legs 133 and 133' are adapted to be pivotally connected to the first portion 110, preferably using attaching points 115 and 115'. The lower legs are adapted to be pivotally connected to the second portion 120, preferably using attaching points 125 and 125'. In a preferred embodiment, the lower legs 135 and 135' are positioned rearward of the upper legs 133 and 133', thus having the third portion 130 being at an angle with regard to first 110 and second 120 portions.

Still referring to FIGS. 2 to 4, in a preferred embodiment, the second section 120 is pivotally connected to a rear transversal frame 160 adapted to pivotally connect the second section 120 to the snowmobile 10. The rear transversal frame 160 comprises a frame 161 and is preferably H-shaped having two upper legs 163 and 163' and two lower legs 165 and 165'. The upper legs 133 and 133' may comprise connecting members 162 and 162' adapted to be attached to the snowmobile 10. The connecting members 162 and 162' are generally adapted to be mounted to a lower mounting point (not shown) of the snowmobile 10 typically adapted to receive a lower control arm of a conventional snowmobile front suspension assembly. The lower legs 165 and 165' are adapted to be pivotally connected to the second portion 120, preferably using attaching points 126 and 126'.

The assembly 100 further comprises a ski attachment section or steering member 140, as shown in FIGS. 2 to 4. In a preferred embodiment, the steering member 140 is pivotally connected to the second section 120, preferably at the front attachment point 122. The steering member 140 is further connected to the steering assembly of the snowmobile 10, preferably through a steering link assembly 150. The steering member 140 generally comprises a frame 141 and a ski attaching point 145. The frame 141 is attached to the second portion 120 at an angle X (see, for instance, FIGS. 5 and 6). The angle X is defined with respect to the axis 142 and is preferably within the range of 0 to 60 degrees. The axis 142 is preferably substantially vertical. Understandably, the axis 142 is substantially perpendicular to the ground surface. The ski attaching point 145 is preferably adapted to receive a kingpin or other attaching means to allow the ski 170 to freely rotate about the transversal axis Y-Y (see FIG. 2). Such free rotation aims at providing a front angular orientation of the ski 170 to adapt the floatation angle of the ski 170.

In a preferred embodiment, the assembly 100 comprises a steering link assembly 150 adapted to link the rotation of the steering of the snowmobile 10 to the ski 170. The steering link assembly 150 generally comprises a front pivoting member 151 and a rear pivoting member 153. The front pivoting member 151 is generally attached at an angle, being preferably between 25° and 50° and more preferably about 35°, to the front of the second section 120 using an attachment point 122. The rear pivoting member 153 is preferably pivotally attached to the rear of the second portion 120, preferably at attachment point 127. The rear pivoting member is also attached at an angle with the second portion 120. The pivoting of the front 151 and rear 153 pivoting members are linked or synchronized, preferably using a connecting member 152. The connecting member 152 is typically connected to each member 151 and 153 using ball joints.

In another embodiment, the steering link assembly 150 could be embodied as cable, such as a push-pull cable. In such an embodiment, the pushing of the cable triggers the rotation of the ski 170 in one direction while the pulling of the cable triggers the rotation of the ski 170 in the other direction.

It should be understood by one skilled in the art that any other known mechanism of linking the steering of the snowmobile 10 to the ski may be used without departing from the scope of the present invention.

The rear pivoting member 153 is preferably connected to the steering rod (not shown) of the snowmobile 10 using link members 154 and 156, the link members 154 and 156 being connected to one of the attaching portions 118 or 118' at an attaching point 116.

In another embodiment, the link members 154 and 156 may be connected to the first section 110.

Understandably, other methods and configurations of attachment of the rear pivoting member 153 to the steering rod (not shown) of the snowmobile 10 may be used without departing from the scope of the present invention.

In a preferred embodiment, the link members 152, 154 or 156 are bearing rods.

Understandably, in order to ensure a structural rigid assembly of the single-ski conversion kit 100, both top and bottom sections 110 and 120 may be further connected using rear rigid members.

In a preferred embodiment, the assembly 100 is adapted to receive at least one damping assembly 500 of the snowmobile 10 and preferably but not limited to two damping assemblies 500. Such configuration aims at keeping both sides balanced when impact efforts are transmitted from the ski 170. Typically, the angle of the damping assemblies 500 as originally installed on a snowmobile 10 is reversed from a A-shape configuration to a V-shape configuration. The angle of the damping assemblies 500 generally aims at improving the maneuverability of the snowmobile while climbing mountains or other uneven terrains.

Understandably, in other embodiments, the assembly 100 may further comprise one or more damping assemblies 500 adapted to be mounted to the snowmobile 10. In such embodiments, the damping assemblies 500 typically present on the snowmobile must be first removed and the one or more damping assemblies 500 of the assembly 100 are then mounted to the snowmobile.

Figure 5:
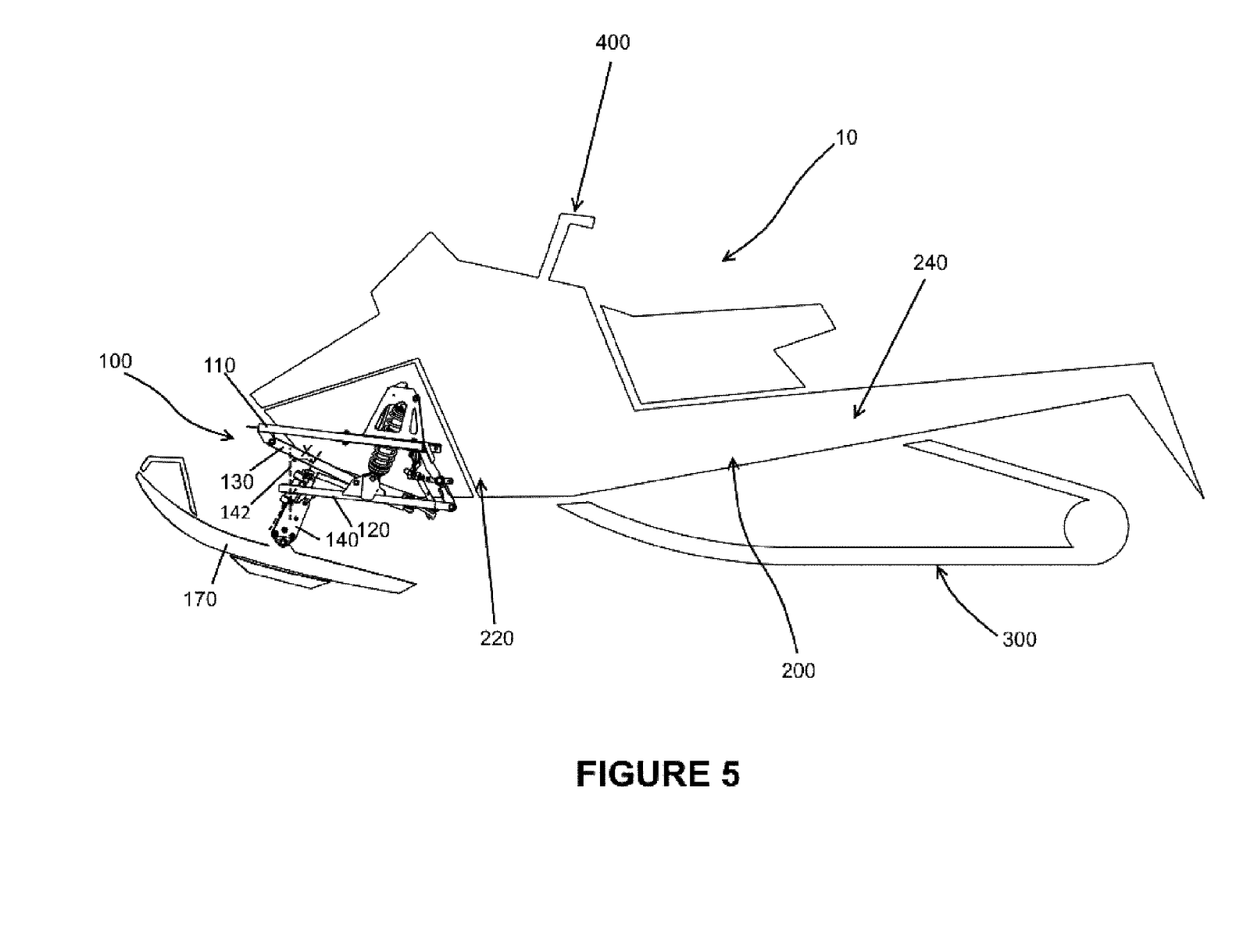
FIG. 5 an elevation view of a side of the single-ski assembly of FIG. 1 being compressed.
Figure 6:
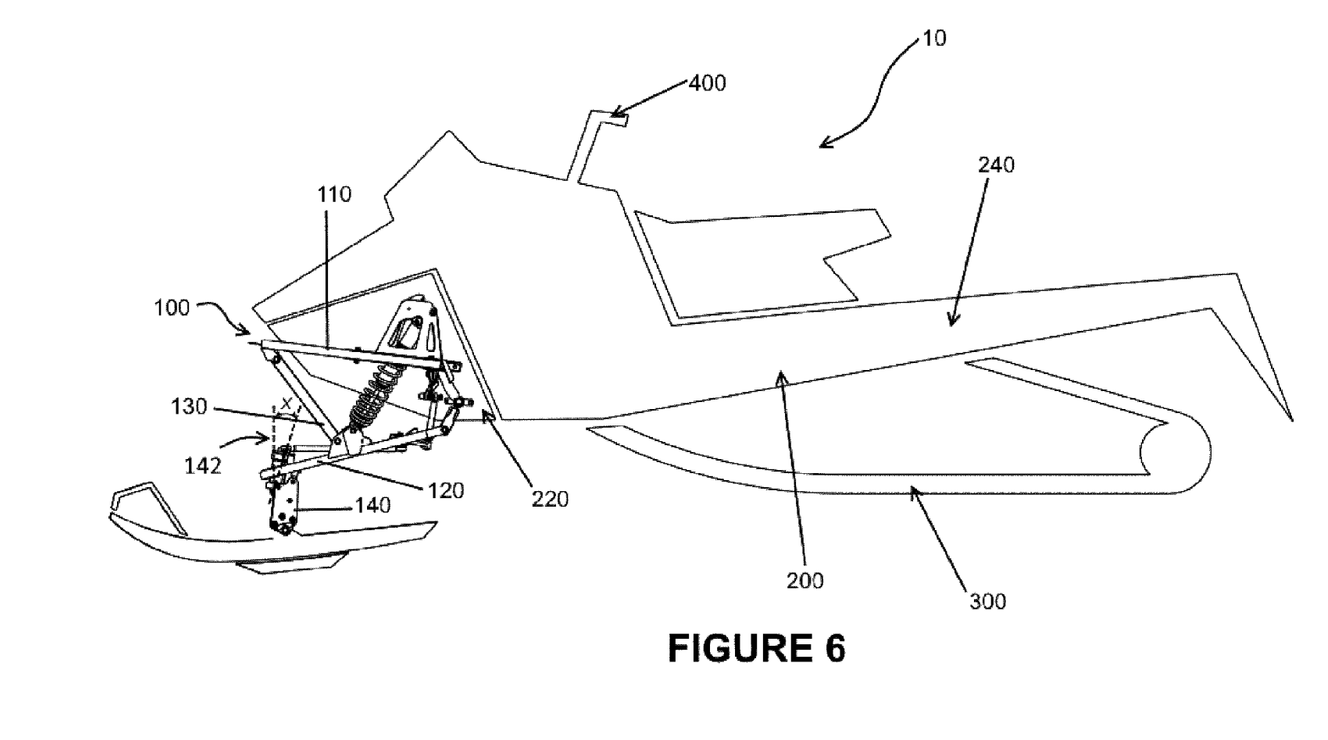
FIG. 6 an elevation view of a side of the single-ski assembly of FIG. 1 being expanded.

Now referring to FIGS. 1, 5 and 6, a single-ski assembly 100 is shown while the snowmobile 10 is at rest (FIG. 1) is absorbing a shock or going over a bump (FIG. 5) and is going over a lower terrain or is in the air (FIG. 6). As shown in FIG. 5, the angle X increases when the single-ski assembly absorbs a shock. In such an event (FIG. 5), the first section 110 pivots with regard to the second section 120. In some embodiments, the first section 110 and the second section 120 may be pivoted as being nearly parallel to each other. As the second section 120 is pushed upward, both ends of the third sections 130 pivot to absorb the movement.

As shown in FIG. 5, the angle between the traveling surface of the snowmobile and the ski of the snowmobile increases as the suspension assembly 500 is compressed. Such compression typically occurs when the snowmobile travels over a bump or higher terrain as the ski is pushed toward the snowmobile. In preferred embodiments, as the suspension assembly is further compress, the angle further varies.

As shown in FIG. 6, the angle between the traveling surface of the snowmobile and the ski of the snowmobile decreased as the suspension assembly 500 is expanded. Such expansion typically even typically occurs when the snowmobile travels over lower terrain or a depression as the ski is pulled toward the ground.

Still referring to FIG. 6, the angle X decreases when the single-ski assembly 100 goes over lower terrain. In such an event, the first section 110 pivots with regard to the second section 120, the two sections 110 and 120 being pulled away one from the other. As the second section 120 is pulled downward by gravity and by the weight of the ski 170, both ends of the third sections 130 pivot and thus controlling and limiting the movement of the second section 120.

Such variation in the angle aims at increasing the maneuverability when turning and the general floatability of the snowmobile compared to known single-ski vehicles, such as snowbikes.

Figure 7:
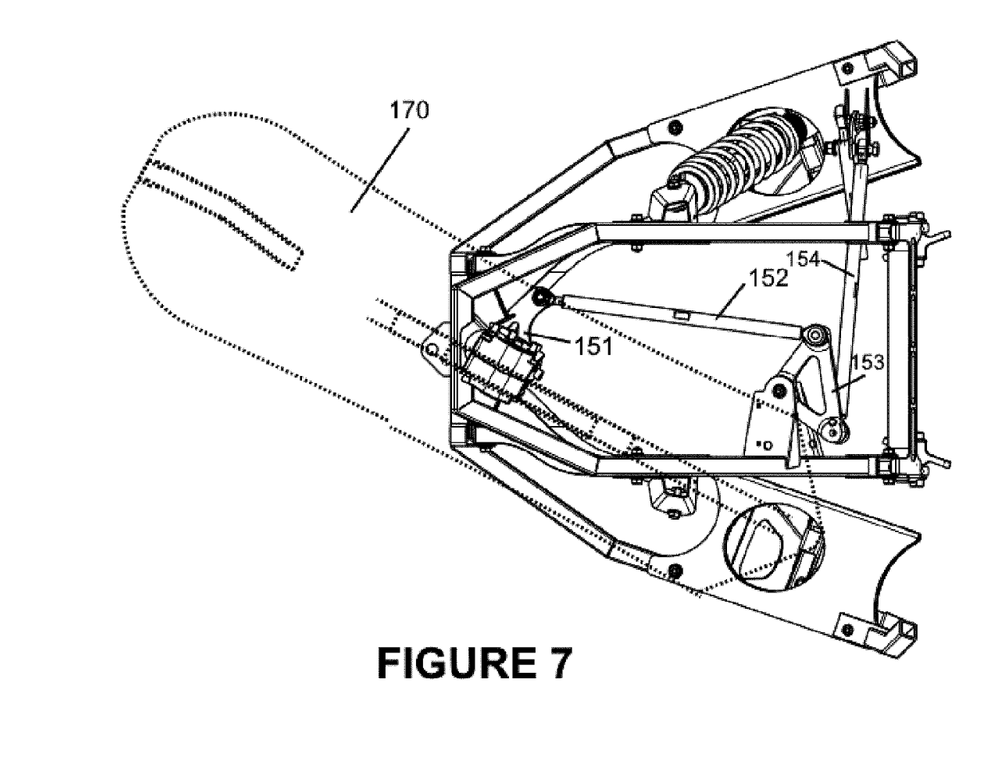
FIG. 7 a bottom view of a single-ski assembly in accordance with the principles of the present invention shown with the ski being turned to the left.
Figure 8:
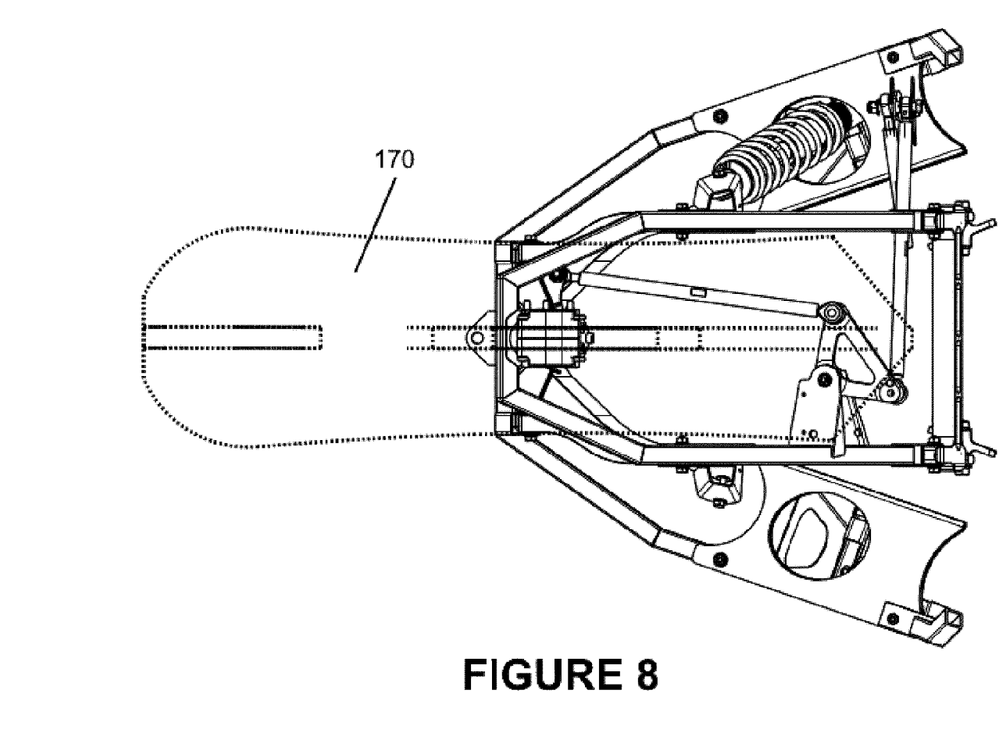
FIG. 8 a bottom view of the single-ski assembly of FIG. 7 shown with the ski being straight.
Figure 9:
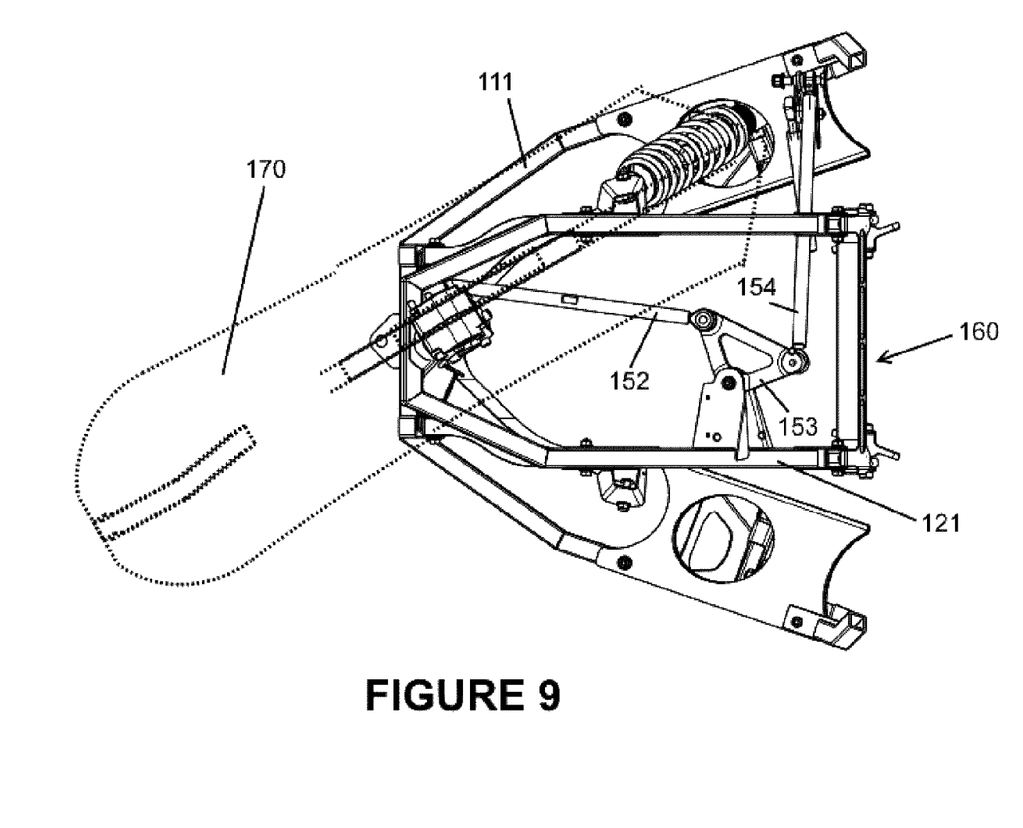
FIG. 9 a bottom view of the single-ski assembly of FIG. 7 shown with the ski being turned to the right.
Figure 10:
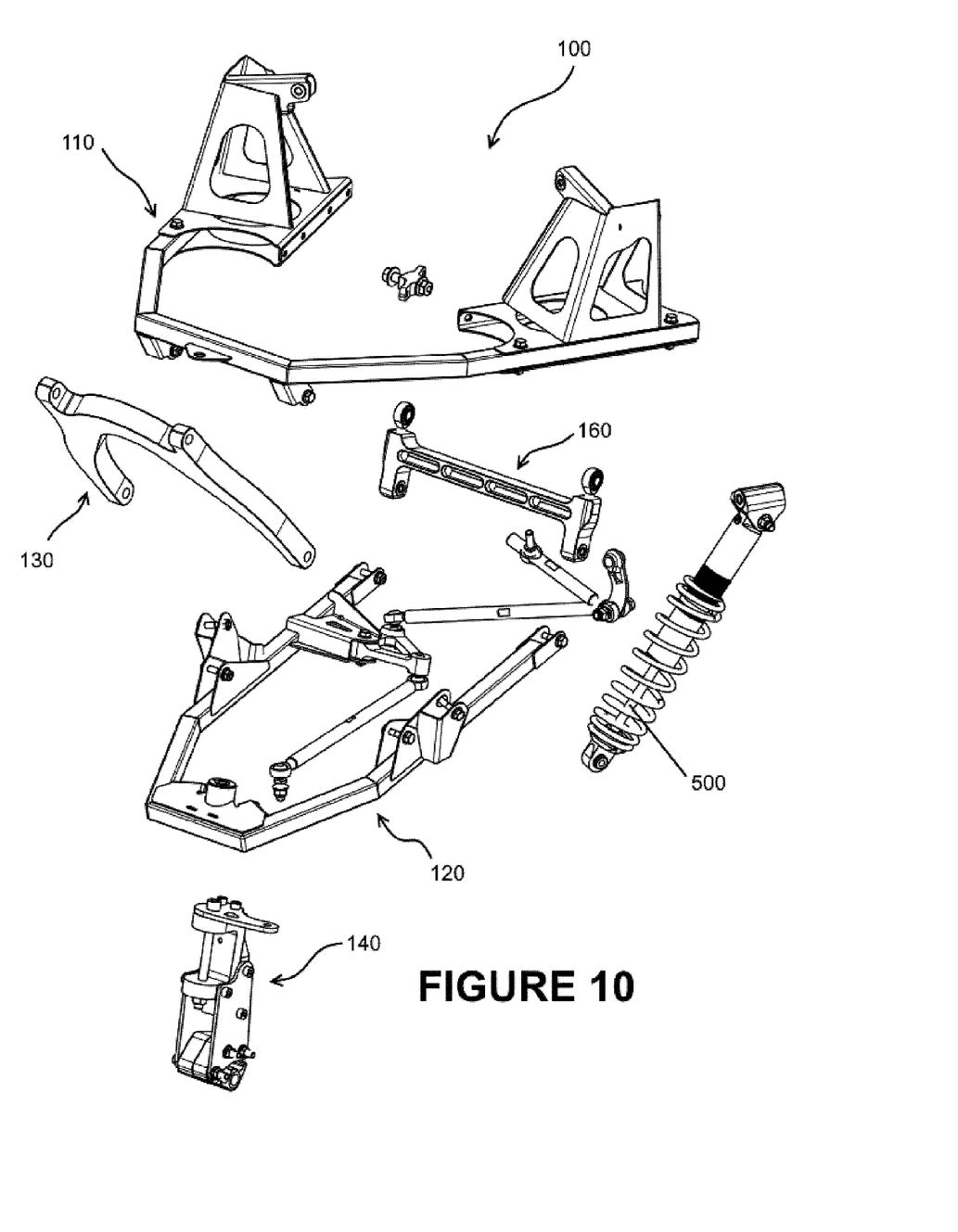
FIG. 10 is a top perspective exploded view of the single-ski assembly of FIG. 1 shown with only one damping assembly.

Referring now to FIGS. 7 to 9, bottom views of the ski 170 being steered to the left (FIG. 7), being straight (FIG. 8) and being steered to the right (FIG. 9) are illustrated. The FIGS. 7 to 9 show an example of a preferred steering link assembly in operation. As the steering is turned, the rear pivoting member 153 is pushed (FIG. 7) or pulled (FIG. 9) or is staying still (FIG. 8). The movement of the rear pivoting member 153 triggers the movement of the front pivoting member 151 through the link member 152. As the pivoting member 151 pivots, the ski 170 is moved left (FIG. 7) or right (FIG. 9).

A method for installing a single ski assembly 100 is also provided. The method comprises attaching the first section 110 to each upper front side 222, 224 of the snowmobile 10, attaching the second section 120 to the lower front sides 222, 224 of the snowmobile, connecting each ends of each damping assembly to the first section 110 and to the second section 120, attaching the steering rod or steering mechanism of the snowmobile 10 to the steering link assembly 150. The step to attach the second section 120 to the lower front sides 222, 224 may further comprise attaching the lower attaching portion 160 to the lower front sides 222, 224 of the snowmobile 10. The step to attach the steering rod or steering mechanism of the snowmobile 10 to the steering link assembly 150 may further comprise attaching a link member 156 to the steering rod of the snowmobile, the link member 156 being connected to the steering link assembly 150.

In embodiments where the single ski assembly 100 is used to convert a two-ski snowmobile to a snowbike, the method may further comprise detaching the damping assemblies 500 of the snowmobile, detaching the steering rod from the two-ski assembly, detaching the two-ski assembly from the frame 200 of the snowmobile 10.

In other embodiments, any other geometry, configuration or shape of the single ski assembly 100 may be used if such configuration provides an adjustable angular front orientation of the ski 170. Furthermore, any other configuration may be used if the single-ski assembly 100 may be attached to a conventional snowmobile through the same original attaching means being initially configured to hold the double-ski assembly.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A single-ski assembly for a snowmobile being adapted to receive at least two skis and comprising a steering assembly, the single-ski assembly comprising:
   a first plurality of attachment points attachable to a first front side portion of the snowmobile;
   a second plurality of attachment points attachable to a second front side portion of the snowmobile; and
   a steering member connectable to the steering assembly and attachable to a ski, the angle between the steering member and an axis substantially perpendicular to a travelling surface being between 0 degree and 60 degrees.

2. The single-ski assembly of claim 1, the single-ski assembly further comprising a frame adapted to compress and expand with regard to the front portion of the snowmobile.

3. The single-ski assembly of claim 1, the single-ski assembly further comprising:
   a first pivotable attachment portion attachable to the front portion of the snowmobile;
   a second pivotable attachment portion, the second pivotable attachment portion being pivotally connected to a ski about a first axis and being pivotally connected to a lower portion of the snowmobile;
   at least one suspension system comprising a first and a second end, the first end being attachable to the front portion of the snowmobile and the second end being attachable to the second pivotable attachment portion.

4. The single-ski assembly of claim 3, the first pivotable attachment portion being pivotally attachable to the front portion of the snowmobile about an axis substantially parallel to the length of the snowmobile.

5. The single-ski assembly of claim 3, the second attachment portion being pivotally attached to the second end of the suspension system about an axis substantially parallel to the width of the snowmobile.

6. The single-ski assembly of claim 3, the single-ski assembly further comprising a third attachment portion, the third attachment portion comprising a first and a second end, the first end being pivotally attached to the first attachment portion and the second end being pivotally attached to the second attachment portion.

7. The single-ski assembly of claim 6, the third attachment portion being H-shaped.

8. The single-ski assembly of claim 3, the first and second attachment portions being U-shaped.

9. The single-ski assembly of claim 3 the suspension system comprising two suspension members, each suspension member comprising a first and a second end, each first end being attached to the first attachment portion and each second end being attached to the second attachment portion.

10. The single-ski assembly of claim 9, the first and second suspension members being attached to the first and second attachment portions to form an angle about a vertical axis.

11. The single-ski assembly of claim 3, the angle between a front portion of the ski and a travelling surface being between 0 degree and 60 degrees.

12. The single-ski assembly of claim 3, the second attachment portion further comprising a ski attachment member adapted to be pivoted by the steering assembly of the snowmobile.

13. The single-ski assembly of claim 12, the single-ski assembly further comprising a linking member between the ski attachment member and the steering assembly of the snowmobile.

14. The single-ski assembly of claim 3, wherein when the suspension system is compressed, the angle between a front portion of the ski and a travelling surface increases and wherein when the suspension system is expanded, the angle between the front portion of the ski and the travelling surface decreases.

15. The single-ski assembly of claim 3 further comprising two suspension attaching assemblies, each of the two suspension attaching assemblies comprising:
   a first attachment point for receiving a suspension assembly of the snowmobile;
   a second attachment point for attaching to the snowmobile; and a connecting member between the first and second attachment points of the suspension attaching assembly to distally position the first attachment point from the snowmobile.

* * * * *